United States Patent
Bin Ahmad et al.

(10) Patent No.: US 10,609,915 B2
(45) Date of Patent: Apr. 7, 2020

(54) DUAL-BEARING REEL

(71) Applicant: Shimano Components (Malaysia) SDN. BHD., Pontian, Johor (MY)

(72) Inventors: Abu Supian Bin Ahmad, Johor (MY); Mohd Syamsul Johary Bin Ismail, Johor (MY); Baihaki Bin Sabtu, Johor (MY); Muhd Syukri Nazry Bin Mustapha, Johor (MY)

(73) Assignee: SHIMANO COMPONENTS (MALAYSIA) SDN. BHD., Pontian, Johor (MY)

( * ) Notice: Subject to any disclaimer, the term of this patent is extended or adjusted under 35 U.S.C. 154(b) by 0 days.

(21) Appl. No.: 16/407,489

(22) Filed: May 9, 2019

(65) Prior Publication Data

US 2019/0373876 A1 Dec. 12, 2019

(30) Foreign Application Priority Data

Jun. 11, 2018 (JP) ................................. 2018-110995

(51) Int. Cl.
*A01K 89/01* (2006.01)
*A01K 89/015* (2006.01)
*A01K 89/033* (2006.01)

(52) U.S. Cl.
CPC .... *A01K 89/0186* (2015.05); *A01K 89/01931* (2015.05); *A01K 89/01921* (2015.05); *A01K 89/033* (2013.01)

(58) Field of Classification Search
CPC ............ A01K 89/0183; A01K 89/0186; A01K 89/0189; A01K 89/0191; A01K 89/0192
See application file for complete search history.

(56) References Cited

U.S. PATENT DOCUMENTS

| 5,996,919 | A  | * | 12/1999 | Murayama | A01K 89/0193 242/279 |
|---|---|---|---|---|---|
| 2007/0181728 | A1 | * | 8/2007 | Kawasaki | A01K 89/00 242/310 |
| 2013/0193250 | A1 | * | 8/2013 | Ikebukuro | A01K 89/01903 242/261 |
| 2015/0181853 | A1 | * | 7/2015 | Niitsuma | A01K 89/015 242/257 |
| 2015/0296762 | A1 | * | 10/2015 | Haraguchi | A01K 89/015 242/261 |

(Continued)

FOREIGN PATENT DOCUMENTS

JP 2013-153659 A 8/2013

*Primary Examiner* — Emmanuel M Marcelo
(74) *Attorney, Agent, or Firm* — United IP Counselors, LLC

(57) ABSTRACT

A dual-bearing reel is disclosed. The dual-bearing reel is configured to release a fishing line forward and includes a reel body, a clutch operating member, a clutch plate, and a fixing member. The clutch operating member is supported on the reel body movably in the up-down direction. The clutch plate is rotatably supported by the reel body and includes an extending portion extending in the axial direction and fixed to the clutch operating member to be integrally movable therewith, and a through hole in the extending portion. The fixing member fixes the clutch operating member to the extending portion via the through hole of the clutch plate. The through hole has a clearance with respect to the fixing member in the axial direction.

8 Claims, 4 Drawing Sheets

(56) References Cited

U.S. PATENT DOCUMENTS

2015/0327527 A1* 11/2015 Ikebukuro .......... A01K 89/0192
 242/264
2019/0116772 A1* 4/2019 Haraguchi ......... A01K 89/0186

* cited by examiner

DUAL-BEARING REEL

CROSS-REFERENCE TO RELATED APPLICATIONS

This application claims priority to Japanese Patent Application No. 2018-110995, filed Jun. 11, 2018. The contents of that application are incorporated by reference herein in their entirety.

BACKGROUND

Technical Field

The present disclosure relates to a fishing reel, in particular, to a dual-bearing reel capable of releasing a fishing line forward.

Background Information

A dual-bearing reel includes a clutch operating member for switching the transmitting and blocking of the rotational force from a handle to a spool. The clutch operating member is coupled to a clutch control mechanism via a clutch plate. Further, the clutch operating member is movable in the up-down direction at the rear of a reel body and is disposed with a slight gap between both side plates of the reel body (refer to Japanese Laid-open Patent Application Publication No. 2013-153659).

BRIEF SUMMARY

The smaller the gap between the clutch operating member and both side plates of the reel body, the more the fishing line is prevented from entering this gap, and thus entanglement of the fishing line is less likely to occur. In a conventional clutch operating member, however, when fixing the clutch operating member to the clutch plate with screws, the position to fix the clutch operating member cannot be adjusted. For this reason, when the gap between the side plates of the reel body is reduced, the clutch operating member is biased due to a dimensional error, whereby the clutch operation member is likely to strongly come into contact with one of the side plates. Further, there is a possibility that the gap between the clutch operating member and the side plates becomes imbalanced on the left and right sides, and the appearance is poor in this case.

An object of the present disclosure is to make it possible to dispose the clutch operating member at an appropriate position with respect to the reel body.

A dual-bearing reel according to an aspect of the present disclosure is configured to release a fishing line forward and includes a reel body, a clutch operating member, a clutch plate, and a fixing member. The clutch operating member is supported on the reel body movably in the up-down direction. The clutch plate is rotatably supported by the reel body and includes an extending portion and a through hole formed in the extending portion, the extending portion extending in the axial direction and fixed to the clutch operating member to be movable integrally with the clutch operating member. The fixing member fixes the clutch operating member to the extending portion of the clutch plate via the through hole in the clutch plate. The through hole in the clutch plate has a clearance with respect to the fixing member in the axial direction.

In this dual-bearing reel, since the through hole in the clutch plate has a clearance with respect to the fixing member in the axial direction, the axial position of the clutch operating member with respect to the reel body can be adjusted and fixed when fixing the clutch operating member to the extending portion of the clutch plate with the fixing member via the through hole. Therefore, even when a dimensional error occurs, for example, the clutch operating member can be disposed at an appropriate position with respect to the reel body by adjusting the axial position of the clutch operating member and fixing the clutch operating member to the clutch plate.

Preferably, the through hole has a substantially oval shape.

Preferably, the fixing member is a screw member including a head portion and a shaft portion having a diameter smaller than that of the head portion and having a male threaded portion formed on an outer peripheral surface thereof. The clutch operating member includes a female threaded portion to be screwed to the male threaded portion. In this case, it is possible to easily and firmly fix the clutch operating member to the extension portion of the clutch plate.

Preferably, the reel body includes a first side plate and a second side plate disposed apart from the first side plate at an interval in the axial direction. The clutch operating member is disposed between the first side plate and the second side plate in the axial direction. The clutch operating member is slidable with respect to the first sideplate in the up-down direction. In this case also, the clutch operating member can be disposed at an appropriate position with respect to the first side plate of the reel body.

Preferably, the clutch operating member is slidable with respect to the second side plate in the up-down direction. In this case, even if the gap between the clutch operating member and both side plates of the reel body is reduced and the clutch operating member is biased due to a dimensional error, the clutch operating member can be prevented from strongly coming into contact with one of the side plates. In addition, it is possible to prevent the left and right side gaps between the clutch operating member and the both side plates from becoming imbalanced.

Preferably, the dual-bearing reel further includes a barrier portion disposed on one of the clutch operating member and the reel body for preventing a fishing line from entering the gap between the clutch operating member and the first side plate of the reel body. In this case, the clutch operating member can be disposed at an appropriate position with respect to the first side plate of the reel body, and entanglement of the fishing line between the clutch operating member and the reel body can be prevented by the barrier portion.

According to the present disclosure, the clutch operating member can be disposed at an appropriate position with respect to the clutch reel body.

BRIEF DESCRIPTION OF THE DRAWINGS

Referring now to the attached drawings which form a part of this original disclosure.

DETAILED DESCRIPTION

In the following descriptions, when fishing, the direction in which a fishing line is unreeled (cast) is referred to as the "front" and the opposite direction is referred to as the "rear". Further, the term "left and right" indicates the left and right side when a dual-bearing reel 100 is viewed from the rear. Also, the term "axial direction" indicates an extending direction of a spool shaft 10 (refer to FIG. 2).

Figure 1:
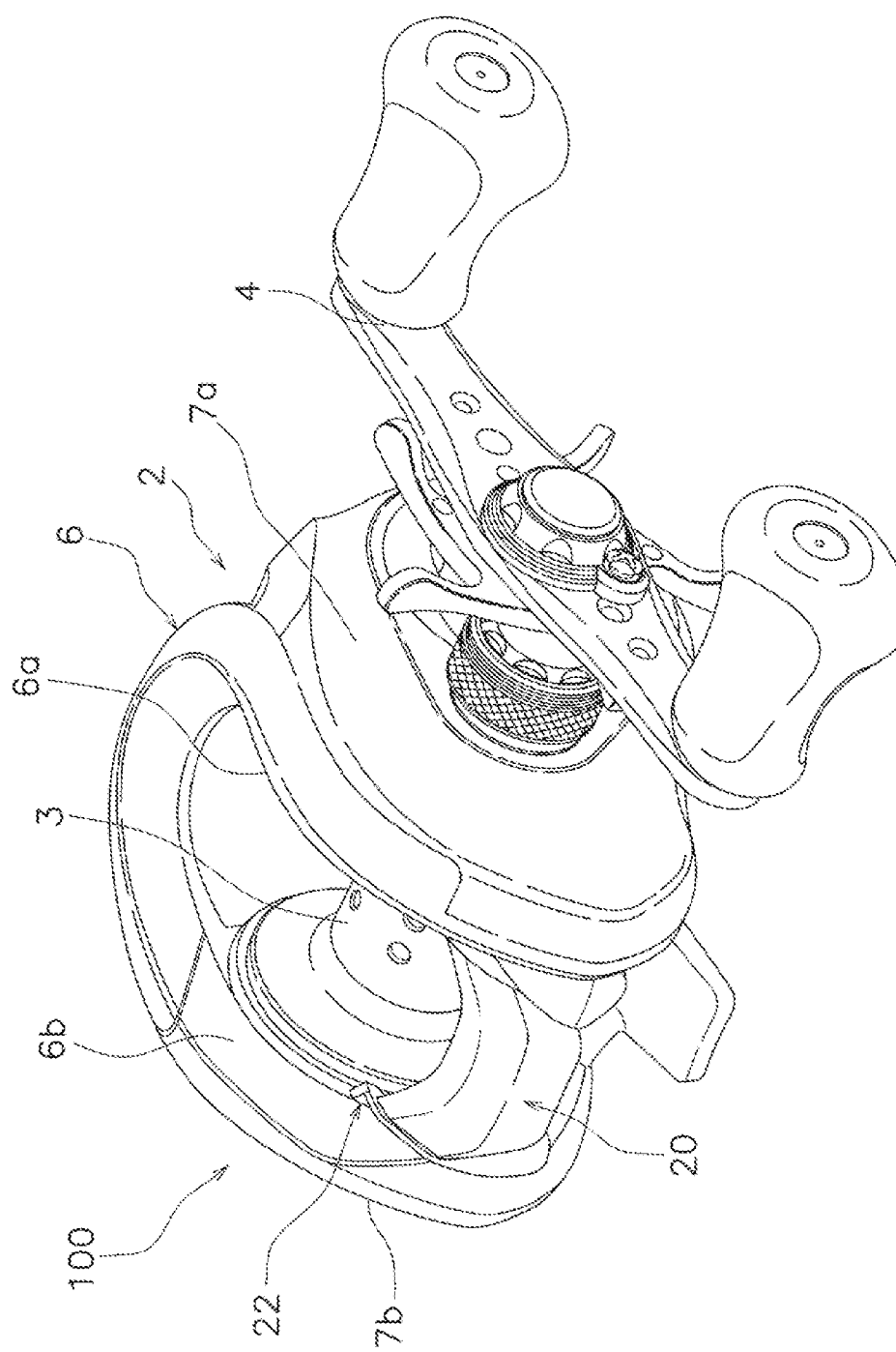
FIG. 1 is a plan view of a dual-bearing reel adopting one embodiment of the present disclosure.
Figure 2:
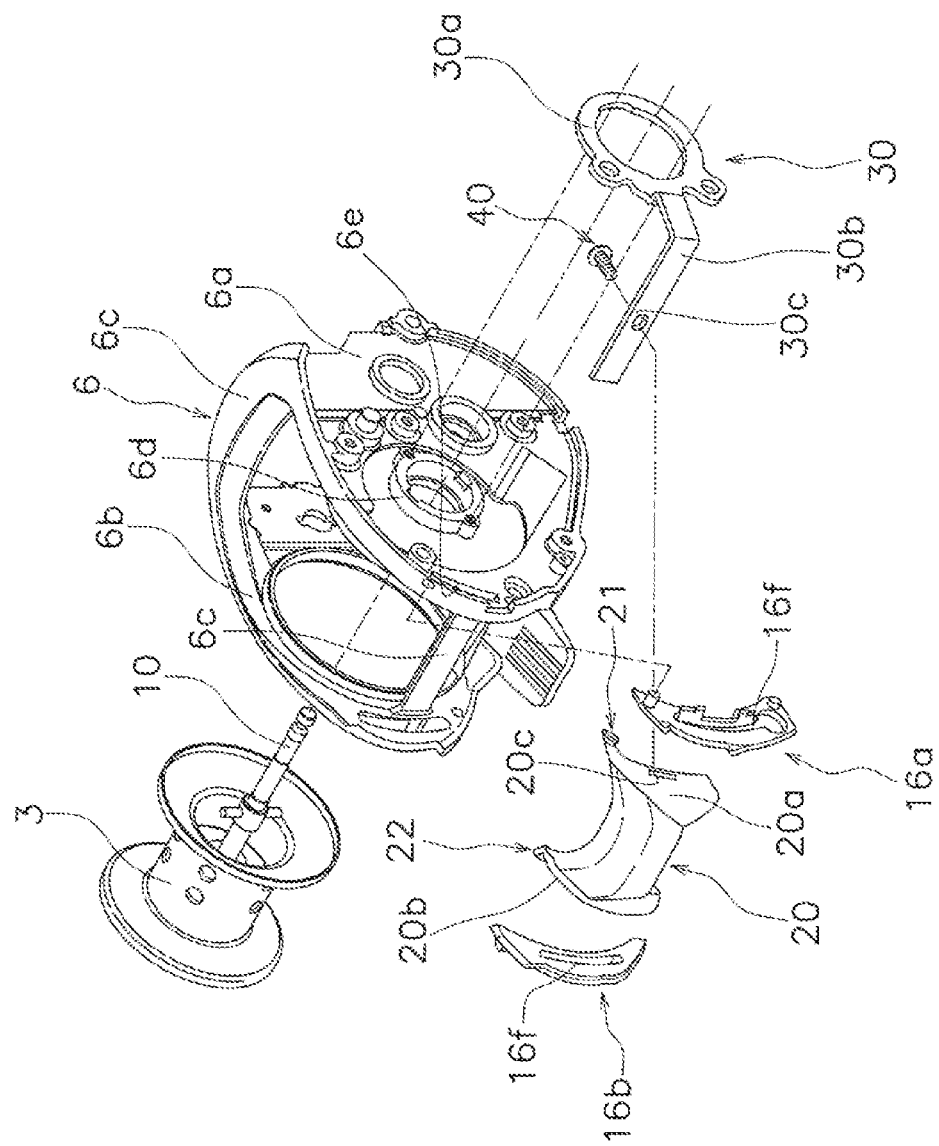
FIG. 2 is an exploded perspective view of a frame, a clutch operating member, and a clutch plate.
Figure 3:
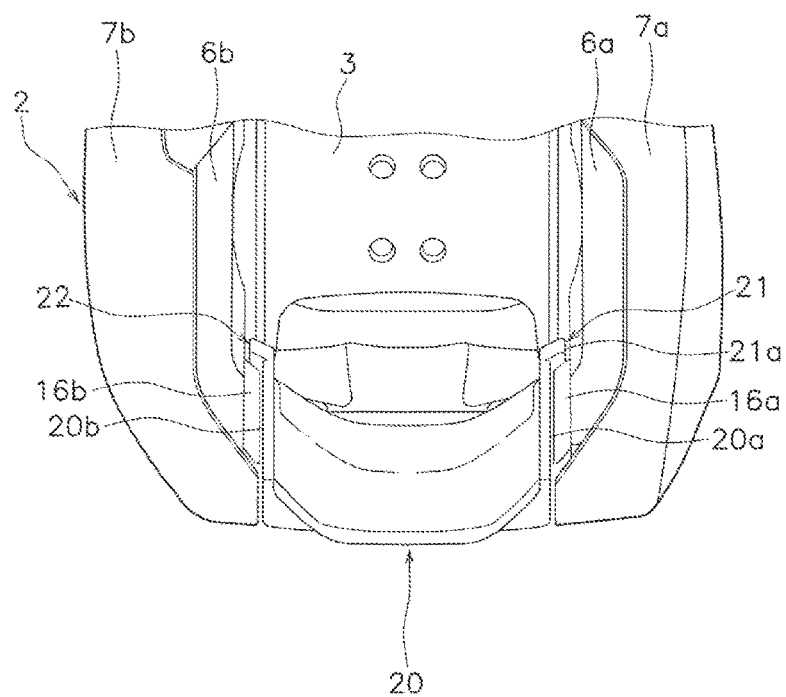
FIG. 3 is a partial plan view of the dual-bearing reel.

The dual-bearing reel 100 adopting an embodiment of the present disclosure is configured to release a fishing line forward. As shown in FIGS. 1 to 3, the dual-bearing reel 100 includes a reel body 2, a spool 3, a handle 4, a clutch operating member 20, a clutch plate 30, and a fixing member 40.

As shown in FIGS. 1 and 2, the reel body 2 includes a frame 6, a first side cover 7a, and a second side cover 7b. The frame 6 includes a first sideplate 6a, a second side plate 6b, and a plurality of coupling portions 6c.

The first side plate 6a is disposed on the right side of the frame 6. The first side plate 6a includes a first guide plate 16a mounted on an inner peripheral surface of the rear portion of the first side plate 6a. The second side plate 6b is disposed on the left side of the frame 6 at an interval from the first side plate 6a in the axial direction. The second side plate 6b includes a second guide plate 16b mounted on an inner peripheral surface of the rear portion of the second side plate 6b. It is to be noted that the first guide plate 16a and the second guide plate 16b can be integrally formed with the frame 6.

The first guide plate 16a and the second guide plate 16b have guide grooves 16f extending substantially in the up-down direction.

The plurality of coupling portions 6c extend in the axial direction and couples the first side plate 6a and the second side plate 6b.

The first side cover 7a covers the right side of the first side plate 6a of the frame 6. The second side cover 7b covers the left side of the second side plate 6b of the frame 6.

The spool 3 is rotatably supported by the reel body 2 between the first side plate 6a and the second side plate 6b. In more detail, the spool 3 is fixed to the spool shaft 10 axially penetrating the center thereof and integrally rotates with the spool shaft 10. The spool shaft 10 is rotatably supported by the reel body 2 via a pair of bearings (not shown) disposed in the reel body 2.

The handle 4 is rotatably supported by the reel body 2. The rotation of the handle 4 is transmitted to the spool 3 via a rotation transmission mechanism (not shown). Since the rotation transmission mechanism herein has the same configuration as a conventional one, an explanation thereof will be omitted.

<Clutch Operating Member 20>

The clutch operating member 20 is a member for switching between transmitting or blocking of the rotational force to the spool 3 in accordance with the rotation operation of the handle 4. The clutch operating member 20 is disposed more rearward than the spool 3 and is supported by the reel body 2 to be movable in the up-down direction between the first side plate 6a and the second side plate 6b in the axial direction.

Figure 4:
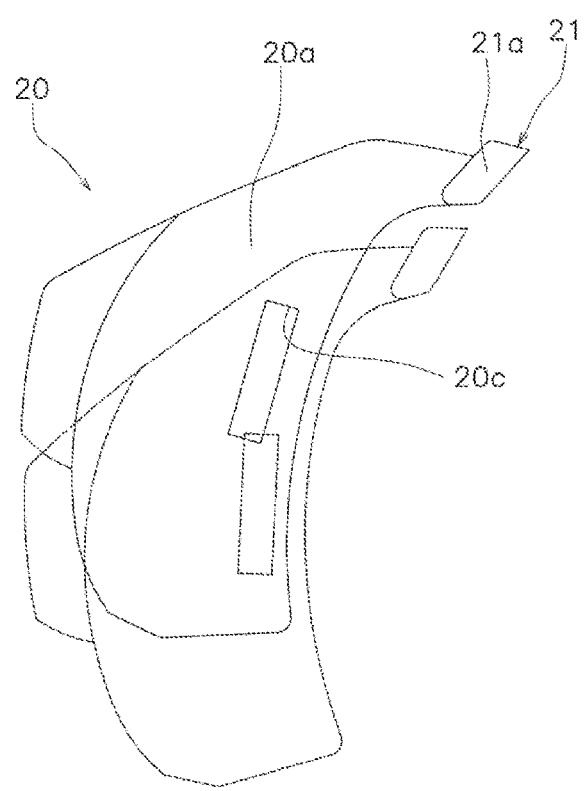
FIG. 4 is a side view of the clutch operating member.

FIG. 4 is a side view of the clutch operating member 20, and the clutch operating member 20 is movable between a first position indicated by a solid line and a second position indicated by a broken line. When the clutch operating member 20 is in the first position, the rotational force of the handle 4 is transmitted to the spool 3. On the other hand, when the clutch operating member 20 is in the second position, the rotational force of the handle 4 is not transmitted to the spool 3.

It should be noted that the clutch operating member 20 is configured to move from the second position to the first position by a clutch return mechanism (not shown) as the handle 4 rotates in the line winding direction when the clutch operating member 20 is in the second position.

As shown in FIG. 3, a first side surface 20a of the clutch operating member 20 on the right side thereof is disposed to face the first guide plate 16a in the axial direction and is slidable with respect to the first guide plate 16a. A second side surface 20b of the clutch operating member 20 on the left side thereof is disposed to face the second guide plate 16b in the axial direction and is slidable with respect to the second guide plate 16b.

The clutch operating member 20 includes a mounting hole 20c, a female threaded portion 20d (refer to FIG. 5), a first barrier portion 21, and a second barrier portion 22. The first barrier portion 21 and the second barrier portion 22 are examples of a barrier portion.

The mounting hole 20c is disposed to penetrate the first side surface 20a and the second side surface 20b of the clutch operating member 20 in the axial direction. The mounting hole 20c is provided for mounting the clutch operating member 20 to the clutch plate 30, and an extending portion 30b (to be described) of the clutch plate 30 passes through the mounting hole 20c.

Figure 5:
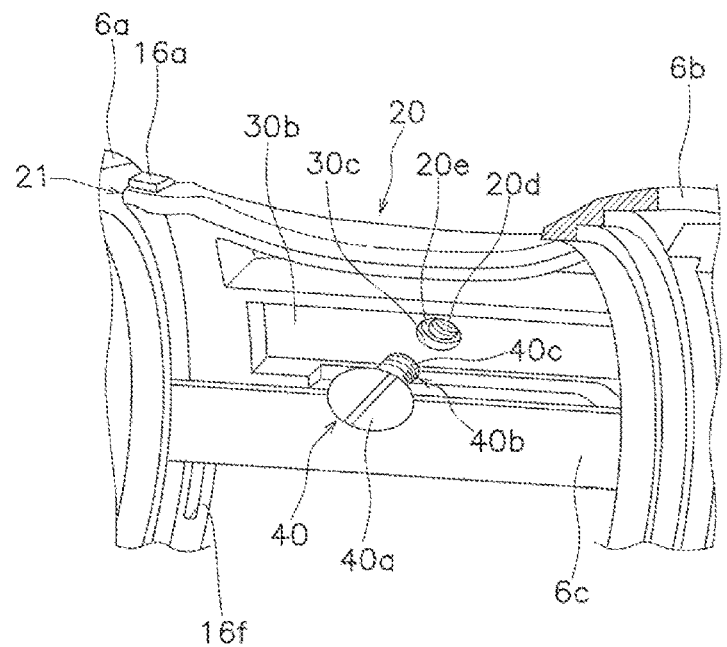
FIG. 5 is a perspective view of the clutch operating member viewed from the inside.

As shown in FIG. 5, the female threaded portion 20d is formed on the inner peripheral surface of a boss portion 20e disposed inside the clutch operating member 20. The female threaded portion 20d is screwed onto a male threaded portion 40c (to be described) of the fixing member 40.

The first barrier portion 21 is disposed on one side of the clutch operating member 20 and the reel body 2 and prevents the fishing line from entering between the clutch operating member 20 and the first side plate 6a of the reel body 2. In the present embodiment, the first barrier portion 21 is disposed on the clutch operating member 20. More specifically, as shown in FIGS. 2 to 4, the first barrier portion 21 is situated at the upper end of the first side surface 20a and protrudes from the first side surface 20a toward the first side plate 6a of the reel body 2. Note that the first barrier portion 21 can be further provided on the lower end side of the first side face 20a.

The first barrier portion 21 moves integrally with the clutch operating member 20. As shown in FIG. 3, the first barrier portion 21 is disposed at a position to face the first guide plate 16a in the front-rear direction and is slidable along the outer edge of the first guide plate 16a. In addition, an outer side surface 21a of the first barrier portion 21 faces the first side plate 6a in the axial direction and is slidable with respect to the first side plate 6a.

The second barrier portion 22 prevents the fishing line from entering between the clutch operating member 20 and the second side plate 6b of the reel body 2. The second barrier portion 22 protrudes from the second side surface 20b of the clutch operating member 20 toward the second side plate 6b of the reel body 2. The second barrier portion 22 has a symmetrical shape with the first barrier portion 21, and a detailed description thereof will be omitted here.

<Clutch Plate 30>

Figure 6:
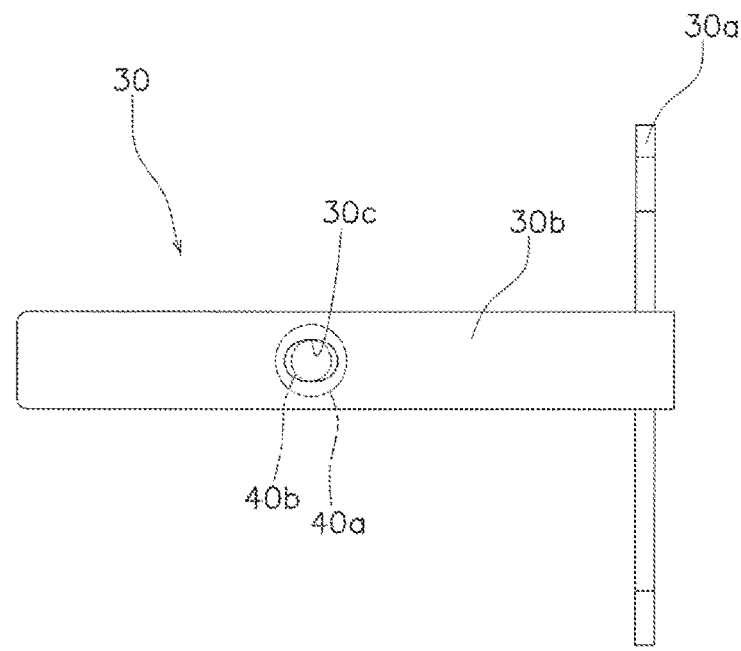
FIG. 6 is a rear view of the clutch plate.

As shown in FIGS. 2 and 6, the clutch plate 30 is a member having a substantially L shape in a plan view and includes a mounting portion 30a, the extending portion 30b, and a through hole 30c. The clutch plate 30 is rotatably supported by the reel body 2. The clutch plate 30 connects the clutch operating member 20 to a clutch control mechanism (not shown). In accordance with the operation of the clutch operating member 20, the clutch control mechanism connects the spool 3 and the handle 4 or releases the connection between the spool 3 and the handle 4. It should be noted that the clutch control mechanism herein has the same configuration as a conventional one, and therefore an explanation thereof will be omitted.

The mounting portion 30a has a ring shape and is rotatably supported on the outer periphery of a boss portion 6d disposed on the first side plate 6a of the reel body 2.

The extending portion 30b extends in a plate shape in the axial direction and is fixed to the clutch operating member 20 so as to be integrally movable therewith. As shown in FIG. 2, the extending portion 30b is inserted axially from an insertion hole 6e disposed in the first side plate 6a of the reel body 2 and passes through the mounting hole 20c of the clutch operating member 20, the guide groove 16f of the first guide plate 16a, and the guide groove 16f of the second guide plate 16b. The extending portion 30b is movable along the guide groove 16f of the first guide plate 16a and the guide groove 16f of the second guide plate 16b, and the mounting portion 30a is rotated in accordance with the movement of the extending portion 30b.

The through hole 30c is provided for fixing the extending portion 30b to be integrally movable with the clutch operating member 20 by the fixing member 40. The through hole 30c is formed in the extending portion 30b so as to penetrate the extending portion 30b in the front-rear direction. The through hole 30c of the clutch plate has a clearance with respect to the fixing member 40 in the axial direction. In the present embodiment, the through hole 30c has a substantially oval shape elongated in the axial direction and has a diameter larger than the inner diameter of the boss portion 20e of the clutch operating member 20 (refer to FIG. 5).

<Fixing Member 40>

As shown in FIG. 5, the fixing member 40 is a member for fixing the clutch operating member 20 to the extending portion 30b of the clutch plate 30 via the through hole 30c of the clutch plate 30.

The fixing member 40 is, for example, a screw member, and has a head portion 40a and a shaft portion 40b. The head portion 40a is formed such that the outer diameter thereof is larger than the axial length of the through hole 30c of the clutch plate 30 (refer to FIG. 6).

The shaft portion 40b has a smaller diameter than that of the head portion 40a, and the shaft portion 40b includes the male threaded portion 40c, on the outer peripheral surface, to be screwed to the female threaded portion 20d of the clutch operating member 20. The shaft portion 40b passes through the through hole 30c and is screwed into the female threaded portion 20d of the clutch operating member 20. Here, since a clearance is provided in the through hole 30c in the axial direction with respect to the fixing member 40, the axial position of the fixing member 40 with respect to the through hole 30c can be adjusted. That is, the axial position of the clutch operating member 20 with respect to the reel body 2 can be adjusted.

<Fixing Procedure>

In order to fix the clutch operating member 20 to the clutch plate 30, first, the clutch operating member 20 is placed between the first guide plate 16a of the first side plate 6a and the second guide plate 16b of the second side plate 6b. Next, the extending portion 30b of the clutch plate 30 is inserted through the insertion hole 6e of the first side plate 6a, whereby the clutch operating member 20 is mounted on the clutch plate 30. Then, as shown in FIG. 5, the shaft portion 40b of the fixing member 40 is screwed into the female threaded portion 20d of the clutch operating member 20 from the front side of the reel body 2 via the through hole 30c, whereby the clutch operating member 20 is temporarily fixed to the clutch plate 30. Subsequently, after adjusting the axial position of the clutch operating member 20, the clutch operating member 20 is fixed to the clutch plate 30.

Here, since the through hole 30c of the clutch plate has a clearance with respect to the fixing member 40 in the axial direction, the clutch operating member 20 is able to be fixed to the clutch plate 30 via the through hole 30c after adjusting the axial position of the clutch operating member 20. With this configuration, even when a dimensional error occurs, for example, the clutch operating member 20 can be disposed at an appropriate position with respect to the reel body 2. For example, in the present embodiment, the gap between the clutch operating member 20 and the first guide plate 16a and the gap between the clutch operating member 20 and the second guide plate 16b can be prevented from becoming unbalanced, thereby improving the appearance of the dual-bearing reel. In addition, the clutch operating member 20 can be prevented from being biased to one side in the left-right direction which results in preventing only one of the first guide plate 16a and the second guide plate 16b from strongly contacting the clutch operating member 20.

Other Embodiments

One embodiment of the present disclosure has been described above; however, the present disclosure is not limited to the above embodiment, and a variety of changes can be made without departing from the scope of the present disclosure. In particular, a plurality of embodiments and modifications described in the present specification can be arbitrarily combined on an as-needed basis.

(a) In the above embodiment, the through hole 30c of the clutch plate 30 has a substantially oval shape, but the through hole 30c can have any shape as long as the position of the fixing member 40 in the axial direction can be adjusted. Further, a configuration can be adopted in which multiple through holes 30c are formed, and the clutch operating member 20 can be fixed to the clutch plate 30 by the plurality of fixing members 40.

(b) In the above embodiment, the clutch operating member 20 is slidably disposed with respect to the first side plate 6a and the second side plate 6b. However, the clutch operating member 20 can be disposed so as to be slidable only on one side plate of the first side plate 6a and the second side plate 6b.

(c) In the above embodiment, the first barrier portion 21 and the second barrier portion 22 are provided on the clutch operating member 20; however, both of the first barrier portion 21 and the second barrier portion 22 are not always required. In addition, the first barrier portion 21 and the second barrier portion 22 can be provided on the reel body 2, or only one of the first barrier portion 21 and the second barrier portion 22 can be provided on the clutch operating member 20 or the reel body 2.

What is claimed is:

1. A dual-bearing reel configured to release a fishing line forward, comprising:
   a reel body;
   a clutch operating member supported on the reel body movably in an up-down direction;
   a clutch plate rotatably supported by the reel body and including an extending portion and a through hole formed in the extending portion, the extending portion extending in an axial direction and fixed to the clutch operating member to be movable integrally with the clutch operating member; and
   a fixing member configured to fix the clutch operating member to the extending portion of the clutch plate via the through hole in the clutch plate,
   the through hole in the clutch plate having a clearance with respect to the fixing member in the axial direction.

2. The dual-bearing reel according to claim 1, wherein the through hole has a substantially oval shape.

3. The dual-bearing reel according to claim 1, wherein the fixing member is a screw member including a head portion and a shaft portion, the shaft portion having a smaller diameter than that of the head portion and having a male threaded portion formed on an outer peripheral surface thereof, and
   the clutch operating member includes a female threaded portion to be screwed to the male threaded portion.

4. The dual-bearing reel according to claim 3, wherein the clutch operating member further includes a mounting hole configured such that the extending portion of the clutch plate is inserted thereinto, and
   the male threaded portion is screwed to the female threaded portion of the clutch operating member via the through hole in a state in which the extending portion of the clutch plate is inserted into the mounting hole of the clutch operating member.

5. The dual-bearing reel according to claim 1, wherein the reel body includes a first side plate and a second side plate disposed apart from the first side plate at an interval in the axial direction, and
   the clutch operating member is disposed between the first side plate and the second side plate in the axial direction and is slidable with respect to the first side plate in the up-down direction.

6. The dual-bearing reel according to claim 5, wherein the clutch operating member is slidable with respect to the second side plate in the up-down direction.

7. The dual-bearing reel according to claim 5, further comprising
   a barrier portion disposed on one of the clutch operating member and the reel body to prevent a fishing line from entering between the clutch operating member and the first side plate of the reel body.

8. The dual-bearing reel according to claim 1, wherein the clutch plate further includes a mounting ring configured to be rotatably supported on an outer periphery of a boss portion disposed on the reel body.

* * * * *